(No Model.)

V. M. BACKUS.
VEHICLE SPRING.

No. 287,404. Patented Oct. 30, 1883.

WITNESSES.
Jacob W. Loeper.
Chas. S. Spritz.

INVENTOR.
Victor M. Backus
By C. P. Jacobs
Atty.

N. PETERS, Photo-Lithographer, Washington, D. C.

UNITED STATES PATENT OFFICE.

VICTOR M. BACKUS, OF INDIANAPOLIS, INDIANA.

VEHICLE-SPRING.

SPECIFICATION forming part of Letters Patent No. 287,404, dated October 30, 1883.

Application filed April 16, 1883. (No model.)

*To all whom it may concern:*

Be it known that I, VICTOR M. BACKUS, of Indianapolis, Indiana, have invented a new and useful Improvement in Vehicle-Springs, of which the following is a description, reference being made to the accompanying drawings, in the several figures of which like letters indicate like parts.

My invention relates to a method of constructing springs for side-bar vehicles, and will be understood from the following description.

Figure 1:
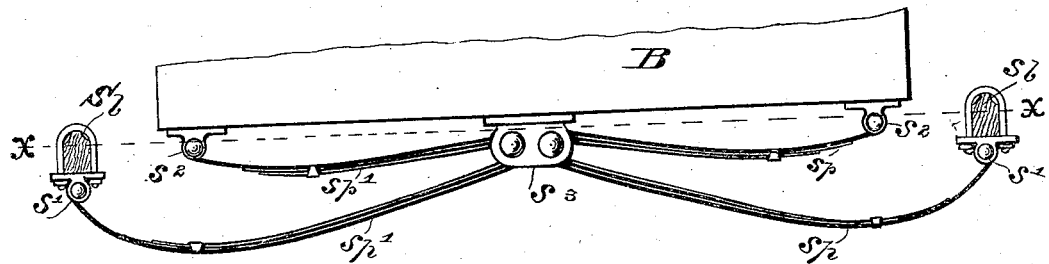
Figure 2:
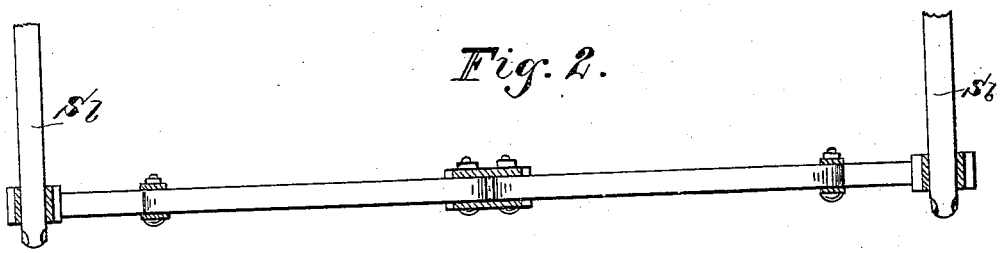
Figure 3:
Figure 4:
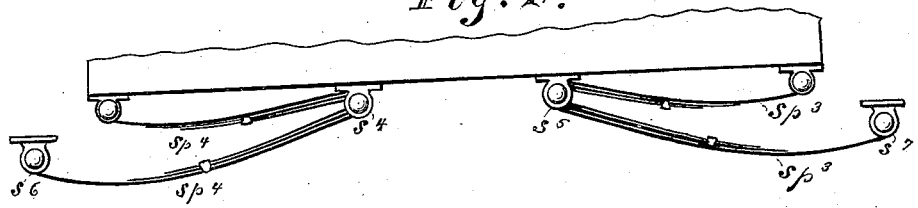

In the drawings, Figure 1 is a rear view of my device; Fig. 2, a top view, partly in cross-section on line $x\ x$, Fig. 1; and Fig. 3, a longitudinal section through the double shackle, showing the curve in the springs. Fig. 4 shows a different method.

In detail, B is the vehicle-box; S$b$, the side bars. $s'\ s'$ are shackles connected to the side bars and with the end of the spring, as shown in Fig. 1. $s^2\ s^2$ are shackle-bolts under the box, and to these the other ends of the springs S$p$ and S$p'$ are attached. $s^3$ is a double shackle, with socket on each side, and the curved ends of the springs S$p$ and S$p'$ pass around bolts in the shackle, as shown in Fig. 3. Thus spring S$p'$ extends from the shackle $s'$ around the bolt of the shackle $s^3$ and recurves to shackle $s^2$. In like manner spring S$p$ extends from shackle $s'$ to shackle $s^2$ on the right-hand side of Fig. 1. This arrangement secures a long spring, which is much preferable to a shorter one for this purpose.

In Fig. 4 is shown a slight modification of the above. Instead of having the ends of the two springs meet in a double shackle common to both, each spring has its own single shackle at the curving end $s^4$ and $s^5$, the springs being marked S$p^3$ and S$p^4$. This makes a shorter and stiffer spring than the one shown in Fig. 1.

I am aware that springs have been secured to the side of a buggy-box and the side bar on the same side, as in the patents of White, December 6, 1881, and Tuttle, August 22, 1882; but these springs are connected together by clips or bolts in front of the rear shackle, thus practically terminating the spring and destroying in a great degree its continuity. I leave my spring entirely open in front of the rear shackle, and thus get the effect of the elasticity of the entire spring. Thus as one part of the spring shortens the other lengthens without let or hinderance, producing a decidedly easier-riding spring than those in which the parts are secured together in front of the rear shackle.

What I claim, and desire to secure by Letters Patent, is the following:

1. The recurved vehicle-spring herein described, one end of which is connected with the side of the box and the other with the bar on the same side, the spring curving round a bolt in a shackle connected with the central portion of a box, with a continuous opening between the upper and lower halves of the spring, these halves being left unconnected in front of the rear shackle to allow free play and expansion of the spring round the rear shackle-bolt.

2. A recurved vehicle-spring, one end of which is attached to the box and the other to the bar on the same side, the rear curved portion connected to the central part of the box by a shackle, round the bolt of which the spring is recurved, the spring left without connection between the recurved portions, in order to allow free play and expansion of the spring round the rear shackle-bolt and to secure the effect of elasticity in the entire length of the spring, substantially as described.

In witness whereof I have hereunto set my hand this 11th day of April, 1883.

VICTOR M. BACKUS.

Witnesses:
  C. P. JACOBS,
  C. S. SPRITZ.